United States Patent [19]
Moody

[11] Patent Number: 6,062,715
[45] Date of Patent: May 16, 2000

[54] COMPUTER IMPLEMENTED AIRCRAFT SIMULATION METHOD AND APPARATUS

[75] Inventor: Larry A. Moody, Florissant, Mo.

[73] Assignee: McDonnell Douglas Corporation, St. Louis, Mo.

[21] Appl. No.: 08/821,434

[22] Filed: Mar. 21, 1997

[51] Int. Cl.$^7$ ...................................................... G09B 9/08
[52] U.S. Cl. ............................................. 364/578; 434/46
[58] Field of Search ................................... 434/45, 29, 49, 434/51, 35, 46, 59; 73/570, 579, 583, 865.6; 364/578

[56] References Cited

U.S. PATENT DOCUMENTS

| | | | |
|---|---|---|---|
| 3,597,857 | 8/1971 | Akister et al. ............................... | 35/12 |
| 3,686,927 | 8/1972 | Scharton ................................... | 73/71.6 |
| 4,030,208 | 6/1977 | Carver et al. ............................. | 35/12 F |
| 4,358,959 | 11/1982 | Lam et al. ............................. | 73/432 R |
| 4,527,980 | 7/1985 | Miller ........................................ | 434/55 |
| 4,599,070 | 7/1986 | Hladky et al. ............................. | 434/45 |
| 4,947,697 | 8/1990 | Prentice ................................. | 73/865.9 |

OTHER PUBLICATIONS

Sheldon et al., Development and first successful flight test of a QFT flight control system, IEEE, pp. 629–636, May 1994.

*Primary Examiner*—Kevin J. Teska
*Assistant Examiner*—Matthew Loppnow
*Attorney, Agent, or Firm*—Westerlund & Powell, P.C.; Robert A. Westerlund; Raymond H.J. Powell, Jr.

[57] ABSTRACT

A flight simulator includes a central processing unit and a flight simulation environment controlled by the central processing unit for simulating the flight of an aircraft. The central processing unit is programmed to observe a full fidelity model of the aircraft in flight so as to extract pilot inputs and aircraft responses at each of successive time intervals. The central processing unit is further programmed to calculate a damping and an undamped natural frequency of the aircraft from the extracted pilot inputs and aircraft responses and to simulate the flight of the aircraft by applying the damping and undamped natural frequency to a second order transfer function.

6 Claims, 14 Drawing Sheets

FIG. 3(a)

```
FUNCTION ROLL_YAW_LIMIT(A,B)

IMPLICIT NONE
REAL ROLL_YAW_LIMIT, A, B, MODIFIER
LOGICAL*1 CHANGED this function returns the limit of signal "A" based on the value
of signal "B" which could be the same or different, depending on the
calling program limit roll or yaw axis to +/- 180.0 degrees, don't modify anything if it
has already been modified in the same direction.

CHANGED = .FALSE.
ROLL_YAW_LIMIT = 0.0
MODIFIER       = 0.0

IF (B .LT. -180.0 ) THEN
        MODIFIER = 360.0
        CHANGED = .TRUE.
ELSE IF (B .GT. 180.0 ) THEN
        MODIFIER = -360.0
        CHANGED = .TRUE.
ENDIF

ROLL_YAW_LIMIT = A + MODIFIER

IF (CHANGED) RETURN if signal "B" (the basis signal) has not crossed over the limit,
then check if "B" has already been limited, but "A" not compensated
by noting the difference between "A" and "B".

IF (ABS (B-A) .GT. 300.) THEN
        IF (B .GT. A) THEN
                ROLL_YAW_LIMIT = A + 360.
        ELSE
                ROLL_YAW_LIMIT = A - 360.
        ENDIF
ENDIF

RETURN
END

FUNCTION PITCH_LIMIT(A,B)

IMPLICIT NONE
REAL PITCH_LIMIT, A, B, MODIFIER
LOGICAL*1 CHANGED this function returns the limit of signal "A" based on the value
of signal "B" which could be the same or different, depending on the
calling program limit pitch axis to +/- 90.0 degrees, don't modify anything if it
has already been modified in the same direction.

CHANGED = .FALSE.
PITCH_LIMIT = 0.0
MODIFIER    = 0.0

IF (B .LT. -90.0 ) THEN
        MODIFIER = 2.0 * ( -90.0 - A )
        CHANGED = .TRUE.
ELSE IF (B .GT. 90.0 ) THEN
```

FIG. 3(b)

```
                MODIFIER = - 2.0 * ( A - 90.0 )
                CHANGED = .TRUE.
        ENDIF

PITCH_LIMIT = A + MODIFIER

RETURN
        END

SUBROUTINE PITCH_SMOOTHING ( ZETA, OMEGA )

IMPLICIT NONE

C**BEGIN
****    Referencer Version 2.0(Oct 20 1995), OpenVMS 6.1, 27-Sep-1996 13:10
****    User: M211151
****    Dictionary list: NAP$DISK:[NAP.F18_PROJECTS.T45.DICT]T45.DICT
*                        NAP$DISK:[NAP.F18_700.DICT]F18_700.DICT
*                        NAP$DISK:[NAP.F18BASE.DICT]F18BASE.DICT
*                        NAP$DISK:[NAP.BASE.DICT]BASE.DICT

*****************************************************************
C** XTRP_NUM_AV  ,Decl:RL      Loc:T45_IRAD( 133)
*       NUMBER OF PASSES TO AVERAGE FOR ZETA, OMEGA
*****************************************************************
        REAL*4
     $    XTRP_NUM_AV

*****************************************************************
* GCB COMMON Statements and GCB Vector Declarations
*****************************************************************
*
*Dictionary: NAP$DISK:[NAP.F18_PROJECTS.T45.DICT]T45.DICT
*       DSF: USER3:[NAP.F18_PROJECTS.T45.DSF]T45_IRAD.DSF
        INTEGER*4 GCB$T45_IRAD_LENGTH
        PARAMETER ( GCB$T45_IRAD_LENGTH = 208 )
        INTEGER*1 GCB$T45_IRAD( GCB$T45_IRAD_LENGTH )
        COMMON / T45_IRAD / GCB$T45_IRAD

*****************************************************************
* GCB Vector Equivalences
*****************************************************************
        EQUIVALENCE
     $    (XTRP_NUM_AV,GCB$T45_IRAD(133))
C**END
        REAL ZETA, OMEGA, ZETA_TOT, OMEGA_TOT
        REAL ZETA_HIST(2001)/2001*1.0/,
     $       OMEGA_HIST(2001)/2001*6.28318/
        INTEGER*2 NUM_AV, I, J NUM_AV = 500    ! was 20
        IF (XTRP_NUM_AV.NE.0.0) NUM_AV = IINT (XTRP_NUM_AV)

*       throw out the oldest point, and add the newest point
*       to the history arrays, note that index 1 represents
*       the most recent data

DO I = 1, NUM_AV
            J = NUM_AV - I + 1
```

FIG. 3(c)

```
        ZETA_HIST(J+1) = ZETA_HIST(J)
        OMEGA_HIST(J+1) = OMEGA_HIST(J)
     ENDDO

ZETA_HIST(1) = ZETA
     OMEGA_HIST(1) = OMEGA

ZETA_TOT = 0.0
     OMEGA_TOT = 0.0

DO I = 1, NUM_AV
        ZETA_TOT = ZETA_TOT + ZETA_HIST(I)
        OMEGA_TOT = OMEGA_TOT + OMEGA_HIST(I)
     ENDDO

ZETA  = ZETA_TOT  / NUM_AV
     OMEGA = OMEGA_TOT / NUM_AV

RETURN
     END

SUBROUTINE ROLL_SMOOTHING ( ZETA, OMEGA )

IMPLICIT NONE

C**BEGIN
**** Referencer Version 2.0(Oct 20 1995), OpenVMS 6.1, 27-Sep-1996 13:10
**** User: M211151
**** Dictionary list: NAP$DISK:[NAP.F18_PROJECTS.T45.DICT]T45.DICT
*                     NAP$DISK:[NAP.F18_700.DICT]F18_700.DICT
*                     NAP$DISK:[NAP.F18BASE.DICT]F18BASE.DICT
*                     NAP$DISK:[NAP.BASE.DICT]BASE.DICT

****************************************************************
C** XTRP_NUM_AV  .Decl:RL      Loc:T45_IRAD( 133)
*      NUMBER OF PASSES TO AVERAGE FOR ZETA, OMEGA
****************************************************************
     REAL*4
        XTRP_NUM_AV

****************************************************************
* GCB COMMON Statements and GCB Vector Declarations
****************************************************************
*
*Dictionary: NAP$DISK:[NAP.F18_PROJECTS.T45.DICT]T45.DICT
*      DSF: USER]:[NAP.F18_PROJECTS.T45.DSF]T45_IRAD.DSF
     INTEGER*4 GCB$T45_IRAD_LENGTH
     PARAMETER ( GCB$T45_IRAD_LENGTH = 208 )
     INTEGER*1 GCB$T45_IRAD( GCB$T45_IRAD_LENGTH )
     COMMON / T45_IRAD / GCB$T45_IRAD

****************************************************************
* GCB Vector Equivalences
****************************************************************
     EQUIVALENCE
        (XTRP_NUM_AV,GCB$T45_IRAD(133))
C**END
     REAL ZETA, OMEGA, ZETA_TOT, OMEGA_TOT
     REAL ZETA_HIST(2001)/2001*1.0/,
          OMEGA_HIST(2001)/2001*6.2831$/
     INTEGER*2 NUM_AV, I, J
```

FIG. 3(d)

```
        NUM_AV = 500   ! was 20
        IF (XTRP_NUM_AV.NE.0.0) NUM_AV = IINT (XTRP_NUM_AV)

*       throw out the oldest point, and add the newest point
*       to the history arrays. note that index 1 represents
*       the most recent data DO I = 1, NUM_AV
            J = NUM_AV - I + 1
            ZETA_HIST(J+1) = ZETA_HIST(J)
            OMEGA_HIST(J+1)= OMEGA_HIST(J)
        ENDDO

ZETA_HIST(1) = ZETA
        OMEGA_HIST(1) = OMEGA

ZETA_TOT = 0.0
        OMEGA_TOT = 0.0

DO I = 1, NUM_AV
            ZETA_TOT  = ZETA_TOT  + ZETA_HIST(I)
            OMEGA_TOT = OMEGA_TOT + OMEGA_HIST(I)
        ENDDO

ZETA  = ZETA_TOT  / NUM_AV
        OMEGA = OMEGA_TOT / NUM_AV

RETURN
        END

SUBROUTINE YAW_SMOOTHING ( ZETA, OMEGA )

IMPLICIT NONE

C**BEGIN
**** Referencer Version 2.0(Oct 20 1995), OpenVMS 6.1, 27-Sep-1996 13:10
**** User: M211151
**** Dictionary list: NAP$DISK:[NAP.F18_PROJECTS.T45.DICT]T45.DICT
*                     NAP$DISK:[NAP.F18_700.DICT]F18_700.DICT
*                     NAP$DISK:[NAP.F18BASE.DICT]F18BASE.DICT
*                     NAP$DISK:[NAP.BASE.DICT]BASE.DICT

*****************************************************************
C** XTRP_NUM_AV   .Decl:RL      Loc:T45_IRAD( 133)
*        NUMBER OF PASSES TO AVERAGE FOR ZETA, OMEGA
*****************************************************************
        REAL*4
     $    XTRP_NUM_AV

*****************************************************************
* GCB COMMON Statements and GCB Vector Declarations
*****************************************************************

*
*Dictionary: NAP$DISK:[NAP.F18_PROJECTS.T45.DICT]T45.DICT
*       DSF: USER3:[NAP.F18_PROJECTS.T45.DSF]T45_IRAD.DSF
        INTEGER*4 GCB$T45_IRAD_LENGTH
        PARAMETER ( GCB$T45_IRAD_LENGTH = 208 )
        INTEGER*1 GCB$T45_IRAD( GCB$T45_IRAD_LENGTH )
        COMMON / T45_IRAD / GCB$T45_IRAD

*****************************************************************
* GCB Vector Equivalences
*****************************************************************
```

FIG. 3(e)

```
          EQUIVALENCE
             (XTRP_NUM_AV,GCBST45_IRAD(133))
C**END

REAL ZETA, OMEGA, ZETA_TOT, OMEGA_TOT
          REAL ZETA_HIST(2001)/2001*1.0/,
     *         OMEGA_HIST(2001)/2001*6.28318/
          INTEGER*2 NUM_AV, I, J

NUM_AV = 500  ! was 20
          IF (XTRP_NUM_AV.NE.0.0) NUM_AV = IINT (XTRP_NUM_AV)

*      throw out the oldest point, and add the newest point
   *      to the history arrays, note that index 1 represents
   *      the most recent data DO I = 1, NUM_AV
             J = NUM_AV - I + 1
             ZETA_HIST(J+1) = ZETA_HIST(J)
             OMEGA_HIST(J+1)= OMEGA_HIST(J)
          ENDDO

ZETA_HIST(1) = ZETA
          OMEGA_HIST(1) = OMEGA

ZETA_TOT = 0.0
          OMEGA_TOT = 0.0

DO I = 1, NUM_AV
             ZETA_TOT  = ZETA_TOT  + ZETA_HIST(I)
             OMEGA_TOT = OMEGA_TOT + OMEGA_HIST(I)
          ENDDO

ZETA  = ZETA_TOT  / NUM_AV
          OMEGA = OMEGA_TOT / NUM_AV

RETURN
          END

SUBROUTINE CALCULATE ( AXIS, ZETA, OMEGA,
     *       ACCEL, VELOC, POSIT, INPUT, DT )

IMPLICIT NONE

REAL C1,C2,C3,C4,C5,C6,C7,C8,C9,C10,C11
          REAL OMEGA_HI_LIMIT, OMEGA_LO_LIMIT
          REAL ZETA_HI_LIMIT, ZETA_LO_LIMIT, PI/3.141593/
          REAL TOLERANCE, ZETA, OMEGA, DT
          REAL ACCEL(3), VELOC(2), POSIT(2), INPUT(2)
          INTEGER*2 AXIS  ! 1 = pitch axis, 2 = roll axis, 3 = yaw axis OMEGA_HI_LIMIT = 6.0 * PI
          OMEGA_LO_LIMIT = 0.0
          ZETA_HI_LIMIT  = 4.0
          ZETA_LO_LIMIT  = 0.0
          TOLERANCE      = 0.0001

C1 = (ACCEL(1) - ACCEL(2))/DT
          C2 = ACCEL(1)
          C3 = VELOC(1)
          C4 = INPUT(1)
          C5 = (ACCEL(2) - ACCEL(3))/DT
          C6 = ACCEL(2)
```

FIG. 3(f)

```
C7 = VELOC(2)
C8 = INPUT(2)

! if calculation can not be made, use past value

IF ((ABS(C7).LT.TOLERANCE).OR.(ABS(C3).LT.TOLERANCE)) THEN
    IF (AXIS.EQ.1) CALL PITCH_SMOOTHING ( ZETA, OMEGA )
    IF (AXIS.EQ.2) CALL ROLL_SMOOTHING ( ZETA, OMEGA )
    IF (AXIS.EQ.3) CALL YAW_SMOOTHING ( ZETA, OMEGA )
    RETURN
ENDIF

C9  = C2/C3  - C6/C7
C10 = (C5 - C8)/C7 - (C1 - C4)/C3

! if calculation can not be made, use past value

IF ( ABS(C9) .LT. TOLERANCE ) THEN
    IF (AXIS.EQ.1) CALL PITCH_SMOOTHING ( ZETA, OMEGA )
    IF (AXIS.EQ.2) CALL ROLL_SMOOTHING ( ZETA, OMEGA )
    IF (AXIS.EQ.3) CALL YAW_SMOOTHING ( ZETA, OMEGA )
    RETURN
ENDIF

C11 = (C4 - C1)/C3 - (C2*C10)/(C3*C9)

IF (C11 .GT. TOLERANCE) THEN
    OMEGA = SQRT(C11)
    ZETA  = C10/(2.0 * OMEGA * C9)
    IF (OMEGA .GT. OMEGA_HI_LIMIT) OMEGA = OMEGA_HI_LIMIT
    IF (OMEGA .LT. OMEGA_LO_LIMIT) OMEGA = OMEGA_LO_LIMIT
    IF (ZETA  .GT. ZETA_HI_LIMIT ) ZETA  = ZETA_HI_LIMIT
    IF (ZETA  .LT. ZETA_LO_LIMIT ) ZETA  = ZETA_LO_LIMIT
ENDIF

IF (AXIS.EQ.1) CALL PITCH_SMOOTHING ( ZETA, OMEGA )
IF (AXIS.EQ.2) CALL ROLL_SMOOTHING ( ZETA, OMEGA )
IF (AXIS.EQ.3) CALL YAW_SMOOTHING ( ZETA, OMEGA )

RETURN
END

FUNCTION INTEGRATE ( INPUT, TIME_STEP, A,B,C,D,E,F,
                     PVI1, PVI2, PVO1, PVO2 )

IMPLICIT NONE

REAL INTEGRATE, INPUT, TIME_STEP
REAL A,B,C,D,E,F
REAL PVI1, PVI2, PVO1, PVO2 integrates a second order differential eqn. in the
    z domain, where
                    As**2 + Bs + C
                    ---------------
                    Ds**2 + Es + F

REAL DTO2, DTO2SQ, TOLERANCE
REAL C1, C2, C3, C4, C5, C6
REAL TEMP

TOLERANCE = 0.0000001
INTEGRATE = 0.0
DTO2      = 0.5 * TIME_STEP
DTO2SQ    = DTO2 * DTO2
```

FIG. 3(g)

```
C1 = A + B*DTO2 + C * DTO2SQ
C2 = A * (-2.0) + C * DTO2SQ * 2.0
C3 = A - B*DTO2 + C * DTO2SQ
C4 = D + E*DTO2 + F * DTO2SQ
C5 = D * (-2.0) + F * DTO2SQ * 2.0
C6 = D - E*DTO2 + F * DTO2SQ

IF ( (ABS(D).LT.TOLERANCE).AND.
     (ABS(E).LT.TOLERANCE).AND.
     (ABS(F).LT.TOLERANCE) ) THEN
   INTEGRATE = INPUT
   RETURN
ENDIF

IF ( ABS(C4).LT.TOLERANCE ) THEN
   INTEGRATE = INPUT
   RETURN
ENDIF

TEMP =   INPUT * ( C1 / C4 )
       + PVI1  * ( C2 / C4 ) + PVI2 * ( C3 / C4 )
       - PVO1  * ( C5 / C4 ) - PVO2 * ( C6 / C4 )

IF ( ABS(TEMP).LE.TOLERANCE ) TEMP = 0.0

INTEGRATE = TEMP

RETURN
END

FUNCTION PITCH_EXTRAP ( ROTATE, TIME_STEP,
      ACCEL_I, VELOC_I, POSIT_I, INPUT_I,
      ZETA, OMEGA )

IMPLICIT NONE

LOGICAL ROTATE
REAL ZETA, OMEGA
REAL A,B,C,D,E,F, CMD, PITCH_RATE
REAL PITCH_EXTRAP, TIME_STEP, OUTPUT1, OUTPUT2, OUT2
REAL ACCEL(3), VELOC(2), POSIT(2), INPUT(2)
INTEGER*2 NUM_ITERATIONS, I
REAL PVI1, PVI2, PVO1, PVO2, DT, FACTOR, F1, F2
REAL PITCH_LIMIT, INTEGRATE, TOLERANCE
EXTERNAL PITCH_LIMIT, INTEGRATE
REAL ACCEL_I, VELOC_I, POSIT_I, INPUT_I
LOGICAL FIRSTIME/.TRUE./

IF ( FIRSTIME ) THEN
    ZETA     = 1.0
    OMEGA    = 6.28318
    FIRSTIME = .FALSE.
ENDIF save past values
ACCEL(3) = ACCEL(2)
ACCEL(2) = ACCEL(1)
ACCEL(1) = ACCEL_I
VELOC(2) = VELOC(1)
VELOC(1) = VELOC_I
POSIT(2) = POSIT(1)
POSIT(1) = POSIT_I
```

FIG. 3(h)

```
    INPUT(2) = INPUT(1)
    INPUT(1) = INPUT_I

PITCH_EXTRAP = POSIT_I
    IF (.NOT. ROTATE) RETURN

•   Calculate the transfer function coefficients
•   directly from the past values of the host
•   aircraft model. Note that for the axis argument
•   pitch = 1, roll = 2, yaw = 3

CALL CALCULATE ( 1, ZETA, OMEGA, ACCEL,
        VELOC, POSIT, INPUT, TIME_STEP )

PITCH_EXTRAP = 0.0
    NUM_ITERATIONS = 2
    A = 0.0
    B = 0.0
    C = 1.0
    D = 1.0
    E = 2.0 * ZETA * OMEGA
    F = OMEGA * OMEGA
    FACTOR = 3.0
    F1 = 1.0
    F2 = 1.0
    TOLERANCE = 0.00001

•   IMPORTANT: the last pass values must be obtained
•   from the airplane model that this transfer function
•   will emulate.

CMD  = INPUT(1)
    PVI1 = INPUT(1)
    PVI2 = INPUT(2)
    PVO1 = VELOC(1)
    PVO2 = VELOC(2)

DT = ( TIME_STEP * FACTOR ) / NUM_ITERATIONS

DO I = 1, NUM_ITERATIONS

OUTPUT1 = INTEGRATE ( CMD, DT, A, B, C, D,
                        E, F, PVI1, PVI2, PVO1, PVO2 )

PVO2 = PVO1
        PVO1 = OUTPUT1
        PVI2 = PVI1
        PVI1 = CMD

•       pitch rate feedback error

CMD = F1 * CMD - F2 * OUTPUT1

ENDDO

PVI1 = OUTPUT1
    PVI2 = OUTPUT2
    PVO1 = PITCH_LIMIT(POSIT(1), POSIT(1))
    PVO2 = PITCH_LIMIT(POSIT(2), POSIT(1))
    OUT2 = INTEGRATE(OUTPUT1, TIME_STEP, 0.0, 0.0,
                    1.0, 0.0, 1.0, 0.0, PVI1, PVI2, PVO1, PVO2)
    PVO2 = PITCH_LIMIT(PVO1, OUT2)
    PVO1 = PITCH_LIMIT(OUT2, OUT2)
    PVI2 = PVI1
    PVI1 = OUTPUT1
```

FIG. 3(i)

```
PITCH_EXTRAP = PITCH_LIMIT(OUT2, OUT2)
OUTPUT2 = OUTPUT1

RETURN
END

FUNCTION ROLL_EXTRAP ( ROTATE, TIME_STEP,
     ACCEL_I, VELOC_I, POSIT_I, INPUT_I,
     ZETA, OMEGA )

IMPLICIT NONE

LOGICAL ROTATE
REAL ZETA, OMEGA
REAL A,B,C,D,E,F, CMD, ROLL_RATE
REAL ROLL_EXTRAP, TIME_STEP, OUTPUT1, OUTPUT2, OUT2
REAL ACCEL(3), VELOC(2), POSIT(2), INPUT(2)
INTEGER*2 NUM_ITERATIONS, I
REAL PVI1, PVI2, PVO1, PVO2, DT, FACTOR, F1, F2
REAL ROLL_YAW_LIMIT, INTEGRATE, TOLERANCE
EXTERNAL ROLL_YAW_LIMIT, INTEGRATE
REAL ACCEL_I, VELOC_I, POSIT_I, INPUT_I
LOGICAL FIRSTIME/.TRUE./

IF ( FIRSTIME ) THEN
    ZETA     = 1.0
    OMEGA    = 6.28318
    FIRSTIME = .FALSE.
ENDIF
```

* save past values
```
ACCEL(3) = ACCEL(2)
ACCEL(2) = ACCEL(1)
ACCEL(1) = ACCEL_I
VELOC(2) = VELOC(1)
VELOC(1) = VELOC_I
POSIT(2) = POSIT(1)
POSIT(1) = POSIT_I
INPUT(2) = INPUT(1)
INPUT(1) = INPUT_I

ROLL_EXTRAP = POSIT_I
IF (.NOT. ROTATE) RETURN
```

* Calculate the transfer function coefficients
* directly from the past values of the host
* aircraft model. Note that for the axis argument
* pitch = 1, roll = 2, yaw = 3

```
CALL CALCULATE ( 2, ZETA, OMEGA, ACCEL,
    VELOC, POSIT, INPUT, TIME_STEP )

NUM_ITERATIONS = 2
A = 0.0
B = 0.0
C = 1.0
D = 1.0
E = 2.0 * ZETA * OMEGA
F = OMEGA * OMEGA
FACTOR = 3.0
F1 = 1.0
F2 = 1.0
TOLERANCE = 0.00001
```

FIG. 3(j)

```
:       IMPORTANT: the last pass values must be obtained
:       from the airplane model that this transfer function
.       will emulate.

CMD  = INPUT(1)
        PVI1 = INPUT(1)
        PVI2 = INPUT(2)
        PVO1 = VELOC(1)
        PVO2 = VELOC(2)

DT = ( TIME_STEP * FACTOR ) / NUM_ITERATIONS

DO I = 1, NUM_ITERATIONS

OUTPUT1 = INTEGRATE ( CMD, DT, A, B, C, D,
                         E, F, PVI1, PVI2, PVO1, PVO2 )

PVO2 = PVO1
           PVO1 = OUTPUT1
           PVI2 = PVI1
           PVI1 = CMD

.          roll rate feedback error

CMD = F1 * CMD - F2 * OUTPUT1
        ENDDO

PVI1 = OUTPUT1
        PVI2 = OUTPUT2
        PVO1 = ROLL_YAW_LIMIT(POSIT(1), POSIT(1))
        PVO2 = ROLL_YAW_LIMIT(POSIT(2), POSIT(1))
        OUT2 = INTEGRATE(OUTPUT1, TIME_STEP, 0.0, 0.0,
                    1.0, 0.0, 1.0, 0.0, PVI1, PVI2, PVO1, PVO2)
        PVO2 = ROLL_YAW_LIMIT(PVO1, OUT2)
        PVO1 = ROLL_YAW_LIMIT(OUT2, OUT2)
        PVI2 = PVI1
        PVI1 = OUTPUT1

ROLL_EXTRAP = ROLL_YAW_LIMIT(OUT2, OUT2)
        OUTPUT2 = OUTPUT1

RETURN
        END

FUNCTION YAW_EXTRAP ( ROTATE, TIME_STEP,
              ACCEL_I, VELOC_I, POSIT_I, INPUT_I,
              ZETA, OMEGA )

IMPLICIT NONE

LOGICAL ROTATE
        REAL ZETA, OMEGA
        REAL A,B,C,D,E,F, CMD, YAW_RATE
        REAL YAW_EXTRAP, TIME_STEP, OUTPUT1, OUTPUT2, OUT2
        REAL ACCEL(3), VELOC(2), POSIT(2), INPUT(2)
        INTEGER*2 NUM_ITERATIONS, I
        REAL PVI1, PVI2, PVO1, PVO2, DT, FACTOR, F1, F2, IC
        REAL ROLL_YAW_LIMIT, INTEGRATE, TOLERANCE
        EXTERNAL ROLL_YAW_LIMIT, INTEGRATE
```

FIG. 3(k)

```
        REAL ACCEL_I, VELOC_I, POSIT_I, INPUT_I
        LOGICAL FIRSTIME/.TRUE./

IF ( FIRSTIME ) THEN
           ZETA    = 1.0
           OMEGA   = 6.28318
           FIRSTIME = .FALSE.
        ENDIF

•       save past values
        ACCEL(3) = ACCEL(2)
        ACCEL(2) = ACCEL(1)
        ACCEL(1) = ACCEL_I
        VELOC(2) = VELOC(1)
        VELOC(1) = VELOC_I
        POSIT(2) = POSIT(1)
        POSIT(1) = POSIT_I
        INPUT(2) = INPUT(1)
        INPUT(1) = INPUT_I

YAW_EXTRAP = POSIT_I
        IF (.NOT. ROTATE) RETURN

•       Calculate the transfer function coefficients
•       directly from the past values of the host
•       aircraft model. Note that for the axis argument
•       pitch = 1, roll = 2, yaw = 3

CALL CALCULATE ( 3, ZETA, OMEGA, ACCEL,
            VELOC, POSIT, INPUT, TIME_STEP)

NUM_ITERATIONS = 2
        A = 0.0
        B = 0.0
        C = 1.0
        D = 1.0
        E = 2.0 * ZETA * OMEGA
        F = OMEGA * OMEGA
        FACTOR = 3.0
        F1 = 1.0
        F2 = 1.0
        TOLERANCE = 0.00001

•       IMPORTANT: the last pass values must be obtained
•       from the airplane model that this transfer function
•       will emulate. If using this routine as the front end
•       of the visual system, set CMD to value from direct link,
•       otherwise set it to the first past value of input.

CMD  = INPUT(1)
        PVI1 = INPUT(1)
        PVI2 = INPUT(2)
        PVO1 = VELOC(1)
        PVO2 = VELOC(2)

DT = ( TIME_STEP * FACTOR ) / NUM_ITERATIONS

DO I = 1, NUM_ITERATIONS

PVO1 = PVO1
           PVO2 = PVO2

OUTPUT1 = INTEGRATE ( CMD, DT, A, B, C, D,
                              E, F, PVI1, PVI2, PVO1, PVO2 )

PVO2 = PVO1
```

FIG. 3(I)

```
    PVO1 = OUTPUT1

PVI2 = PVI1
    PVI1 = CMD yaw rate feedback error

CMD = F1 * CMD - F2 * OUTPUT1
ENDDO

PVI1 = OUTPUT1
PVI2 = OUTPUT2
PVO1 = ROLL_YAW_LIMIT(POSIT(1), POSIT(1))
PVO2 = ROLL_YAW_LIMIT(POSIT(2), POSIT(1))
OUT2 = INTEGRATE(OUTPUT1, TIME_STEP, 0.0, 0.0,
                 1.0, 0.0, 1.0, 0.0, PVI1, PVI2, PVO1, PVO2)
PVO2 = ROLL_YAW_LIMIT(PVO1, OUT2)
PVO1 = ROLL_YAW_LIMIT(OUT2, OUT2)
PVI2 = PVI1
PVI1 = OUTPUT1

YAW_EXTRAP = ROLL_YAW_LIMIT(OUT2, OUT2)
OUTPUT2 = OUTPUT1

RETURN
END
```

COMPUTER IMPLEMENTED AIRCRAFT SIMULATION METHOD AND APPARATUS

BACKGROUND OF THE INVENTION

1. Field of the Invention

The present invention relates to an aircraft simulation method and apparatus, and in particular, to an aircraft simulation method and apparatus using a transfer function modeling approach which saves CPU (central processing unit) processing power during a computer implemented simulation of an aircraft.

2. Description of the Related Art

Aircraft simulators are often used in the training of pilots, and typically include a simulation environment as shown in FIG. 1. The simulation environment is generally made up of a mock cockpit 100 having an instrument panel 101, sensor indicators 102, control devices (e.g., flight stick) 103, G-force simulators 104 and video displays 105 for visual simulations, all of which are under control of a CPU 106. To effect simulation, programs are needed to create an aircraft model that has similar performance and flight characteristics to a known existing aircraft. In most instances, the desired aircraft model is incorporated into the simulation environment model as a threat or wingman. Typically, the system operates according to a database of preprogrammed simulation scenarios which are selected by the pilot during a simulated mission.

The aircraft model should preferably require as little CPU processing as possible to allow a large number of the aircraft models to participate in the simulation environment. However, in most circumstances, the known existing aircraft is hosted as a full fidelity model. The full fidelity model calculates the complex set of forces and other variables acting on the aircraft and thus requires substantial processing power to implement. It is not possible to rehost the full-fidelity model as one of many aircraft in a simulation environment without placing severe restrictions on processing power. Nonetheless, most simulations simply incorporate the full fidelity model, and sacrifice the CPU processing power. Other simulation methods include the use of an existing "transfer function" dynamic model in which coefficients are adjusted manually until the aircraft response seems about right to the user.

In short, existing simulators suffer drawbacks in that substantial processing power is needed to implement the full fidelity model, and in that the alternative transfer function dynamic model relies on the manual and often subjective adjustment of the transfer function coefficients.

SUMMARY OF THE INVENTION

It is an object of the present invention to provide a system and method in which an aircraft simulation equivalent to the full fidelity model is achieved without sacrificing CPU processing power.

A flight simulator of the invention includes a central processing unit and a flight simulation environment controlled by the central processing unit for simulating the flight of an aircraft. The central processing unit is programmed to observe a full fidelity model of the aircraft in flight so as to extract pilot inputs and aircraft responses at each of successive time intervals. The central processing unit is further programmed to calculate a damping and an undamped natural frequency of the aircraft from the extracted pilot inputs and aircraft responses and to simulate the flight of the aircraft by applying the damping and the undamped natural frequency to a second order transfer function.

A flight simulation method of the invention is implemented by a central processing unit and a flight simulation environment controlled by the central processing unit for simulating the flight of an aircraft. The method includes observing a full fidelity model of the aircraft in flight so as to extract pilot inputs and aircraft responses at each of successive time intervals, calculating a damping and undamped natural frequency of the aircraft from the extracted pilot inputs and aircraft responses, and simulating the flight of the aircraft by applying the damping and the undamped natural frequency to a second order transfer function.

BRIEF DESCRIPTION OF THE DRAWINGS

The above and other objects and advantages of the present invention will become readily apparent from the description that follows, with reference to the accompanying drawings, in which:

FIGS. 3($a$) through 3($l$) together contain exemplary computer code which may be used in connection with the present invention.

DETAILED DESCRIPTION OF THE PREFERRED EMBODIMENTS

The present invention is characterized by a transfer function utility which automatically creates a simple transfer function aircraft model by observing a high fidelity model as it manuevers through its envelope. The transfer function models are much smaller and faster, making ideal threat models for offline analysis or as part of a desktop or portable simulation environment.

To create the transfer function model, the utility must indirectly calculate $\zeta$ (damping) and $\omega$ (undamped natural frequency) of the full fidelity aircraft by observing the inputs from the pilot to the aircraft and the aircraft response to the inputs. The algorithm used to implicitly solve for these coefficients $\zeta$ and $\omega$ is shown below for the simple case of a roll input.

$$\omega = \pm\sqrt{\frac{(c_4 - c_1)}{c_3} - \frac{(c_2 c_{10})}{(c_3 c_9)}} \qquad \zeta = \frac{c_{10}}{2\omega c_9}$$

where, $$c_1 = \phi''_{i-1} \qquad c_5 = \phi''_{i-2}$$
$$c_2 = \phi'_{i-1} \qquad c_6 = \phi'_{i-2}$$
$$c_3 = \phi_{i-1} \qquad c_7 = \phi_{i-2}$$
$$c_4 = \delta_{\phi' i-1} \qquad c_8 = \delta_{\phi' i-2}$$
$$c_9 = \frac{c_2}{c_3} - \frac{c_6}{c_7} \qquad c_{10} = \frac{-(c_1 - c_4)}{c_3} + \frac{(c_5 - c_8)}{c_7}$$

and where $\phi$ denotes roll, $\phi'$ denotes roll rate, $\phi''$ denotes roll acceleration and $\delta_\phi$ denotes lateral stick deflection.

Then, to effect simulation, the aircraft behavior is assumed to be usual second order dynamics of the form:

$$\phi'' + 2\zeta\omega\phi' + \omega^2 = \delta_\phi$$

This technique approaches an exact solution as the frequency of the input signal decreases to zero, assuming that some perturbations still exist to excite the system dynamics.

Figure 1:
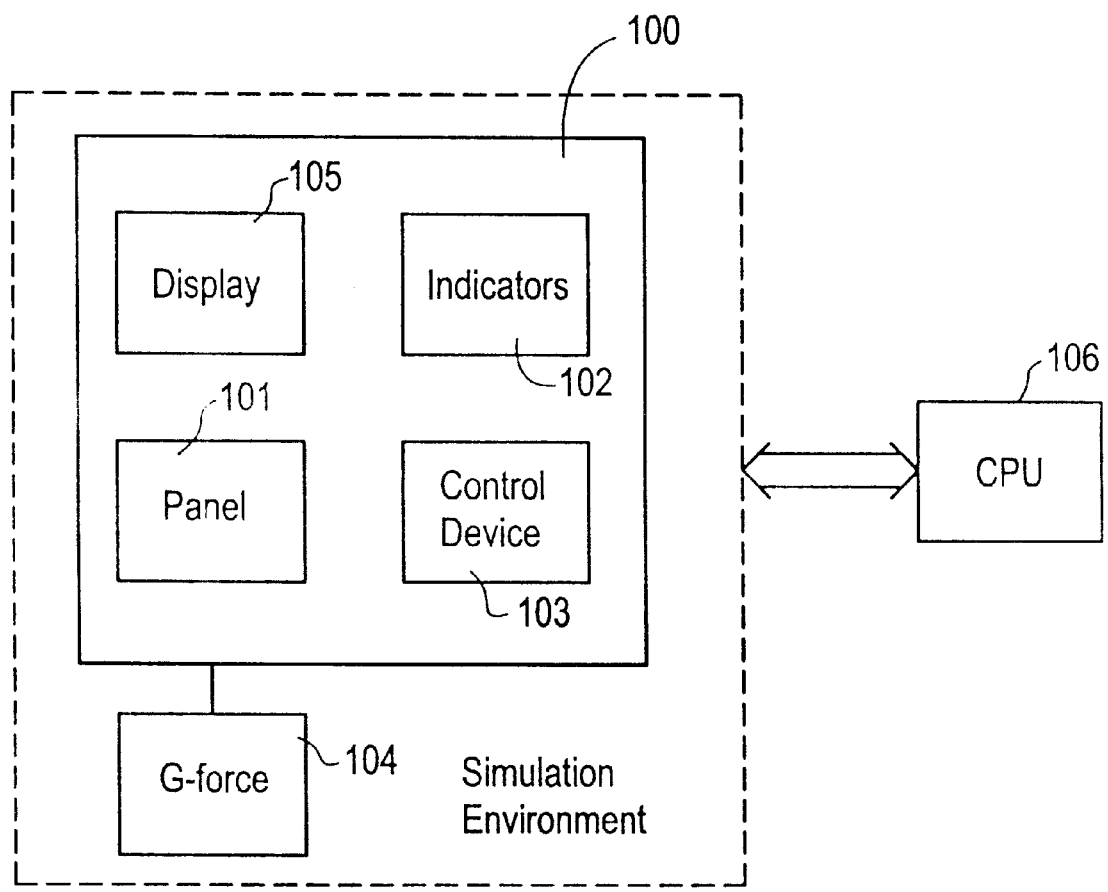
FIG. 1 is a simplified block diagram of a flight simulator.
Figure 2:
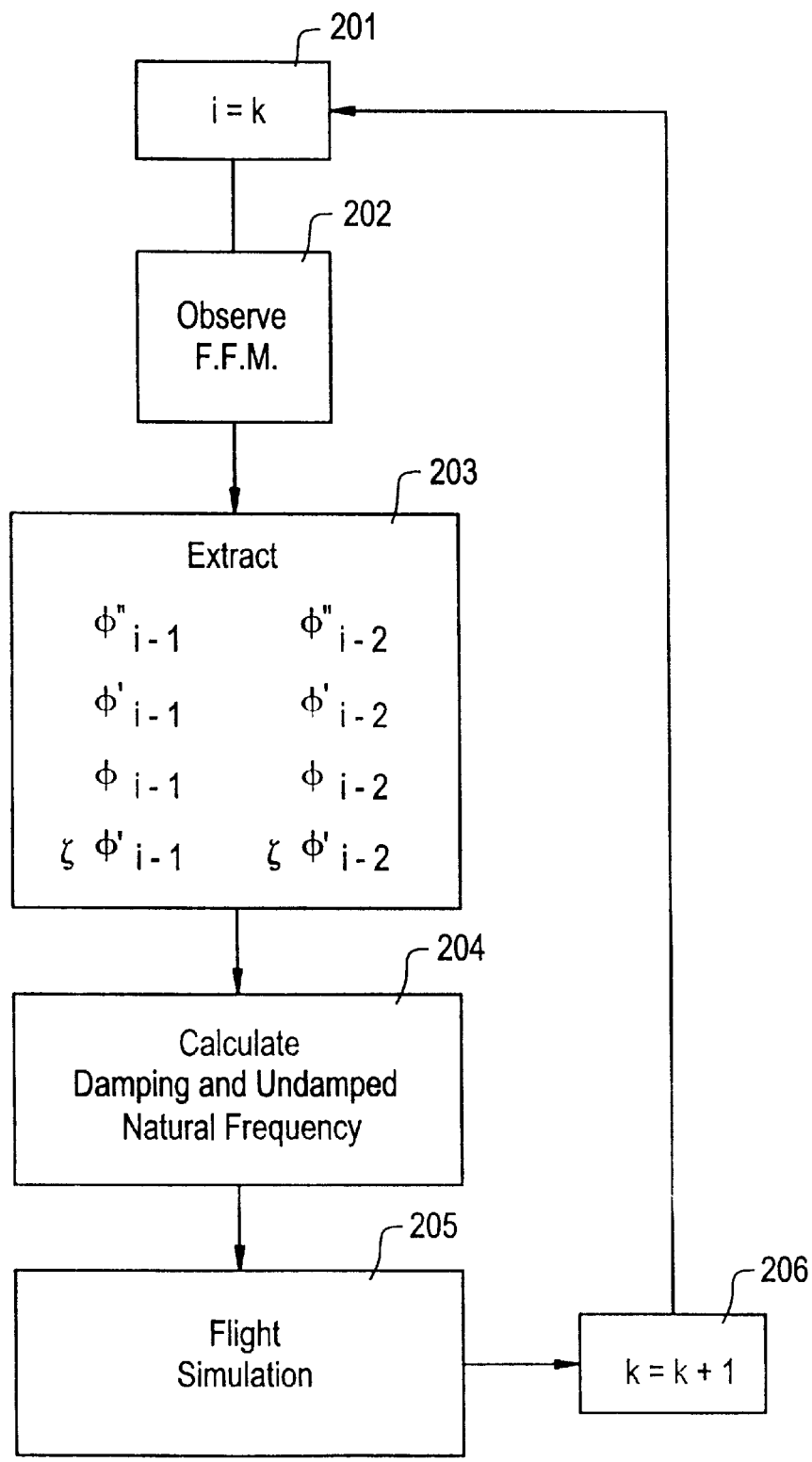
FIG. 2 is an operational flowchart of the flight simulator processing of the present invention.

Reference is now made to the CPU flowchart of FIG. 2. At step 201, a CPU processing interval i is set equal to an incremental value k. Then, the CPU observes the full fidelity model (step 202) and extracts the necessary inputs and aircraft response for the previous two processing intervals (step 203), which in this example are the roll, roll rate, roll acceleration and lateral stick deflection at times i−1 and i−2. These full fidelity observations are applied at step 204 to the transfer utility function to calculate the damping and the undamped natural frequency. Aircraft simulation is then effected at step 205, assuming, as mentioned above, resulting aircraft behavior to be usual second order dynamics. The incremental value k is increased by one (step 206) and the process is then repeated for the next time interval.

The dynamic response of the transfer function model is very close to that of the primary aircraft model, allowing programs to incorporate a smaller model into their environment simulation, yet one which has the same performance.

The invention can be applied to find the coefficient values needed by the transfer function dynamic model to replicate dynamics of a specific aircraft. Another application resides in use by a digital pilot and control system algorithms that treat the aircraft as a second order system. Further, the invention allows calculation of aircraft damping and natural frequency from flight test data.

FIGS. 3(*a*)–3(*l*) contain code which may be used in accordance with the present invention. The code includes various smoothing and similar functions for enhanced implementation of the invention.

Although preferred embodiments of the present invention have been described in detail hereinabove, it should be clearly understood that many variations and/or modifications of the basic inventive concepts herein taught, which may appear to those skilled in the art, will still fall within the spirit and scope of the present invention as defined in the appended claims and their equivalents.

Having thus described my invention, what I claim as new and desire to secure by Letters Patent is as follows:

1. A flight simulation apparatus comprising a central processing unit and a flight simulation environment controlled by said central processing unit for simulating the flight of an aircraft, said central processing unit being programmed to observe a full fidelity model of the aircraft in flight so as to extract pilot inputs and aircraft responses at each of successive time intervals, said central processing unit being further programmed to calculate a damping and an undamped natural frequency of the aircraft from the extracted pilot inputs and aircraft responses and to simulate the flight of the aircraft by applying the damping and undamped natural frequency to a second order transfer function.

2. A flight simulation apparatus as claimed in claim 1, wherein said central processing unit calculates the damping $\zeta$ and the undamped natural frequency $\omega$ of the aircraft in accordance with:

$$\omega = \pm\sqrt{\frac{(c_4 - c_1)}{c_3} - \frac{(c_2 c_{10})}{(c_3 c_9)}} \qquad \zeta = \frac{c_{10}}{2\omega c_9}$$

where, $$c_1 = \phi''_{i-1} \qquad c_5 = \phi''_{i-2}$$
$$c_2 = \phi'_{i-1} \qquad c_6 = \phi'_{i-2}$$
$$c_3 = \phi_{i-1} \qquad c_7 = \phi_{i-2}$$
$$c_4 = \delta_{\phi' i-1} \qquad c_8 = \delta_{\phi' i-2}$$
$$c_9 = \frac{c_2}{c_3} - \frac{c_6}{c_7} \qquad c_{10} = \frac{-(c_1 - c_4)}{c_3} + \frac{(c_5 - c_8)}{c_7}$$

and where $\phi$ denotes roll, $\phi'$ denotes roll rate, $\phi''$ denotes roll acceleration and $\delta_\phi$ denotes lateral stick deflection as observed from the full fidelity model.

3. A flight simulation apparatus as claimed in claim 2, wherein the second order transfer function is represented by:

$$\phi'' + 2\zeta\omega\phi' + \omega^2 = \delta_\phi$$

4. A flight simulation method implemented by a central processing unit and a flight simulation environment controlled by said central processing unit for simulating the flight of an aircraft, said method comprising observing a full fidelity model of the aircraft in flight so as to extract pilot inputs and aircraft responses at each of successive time intervals, calculating a damping and an undamped natural frequency of the aircraft from the extracted pilot inputs and aircraft responses, and simulating the flight of the aircraft by applying the damping and undamped natural frequency to a second order transfer function.

5. A flight simulation method as claimed in claim 4, wherein the damping $\zeta$ and the undamped natural frequency $\omega$ of the aircraft are calculated in accordance with:

$$\omega = \pm\sqrt{\frac{(c_4 - c_1)}{c_3} - \frac{(c_2 c_{10})}{(c_3 c_9)}} \qquad \zeta = \frac{c_{10}}{2\omega c_9}$$

where, $$c_1 = \phi''_{i-1} \qquad c_5 = \phi''_{i-2}$$
$$c_2 = \phi'_{i-1} \qquad c_6 = \phi'_{i-2}$$
$$c_3 = \phi_{i-1} \qquad c_7 = \phi_{i-2}$$
$$c_4 = \delta_{\phi' i-1} \qquad c_8 = \delta_{\phi' i-2}$$
$$c_9 = \frac{c_2}{c_3} - \frac{c_6}{c_7} \qquad c_{10} = \frac{-(c_1 - c_4)}{c_3} + \frac{(c_5 - c_8)}{c_7}$$

and where $\phi$ denotes roll, $\phi'$ denotes roll rate, $\phi''$ denotes roll acceleration and $\delta_\phi$ denotes lateral stick deflection as observed from the full fidelity model.

6. A flight simulator as claimed in claim 5, wherein the second order transfer function is represented by:

$$\phi'' + 2\zeta\omega\phi' + \omega^2 = \delta_\phi$$

* * * * *